United States Patent
Brown et al.

(10) Patent No.: US 9,541,630 B2
(45) Date of Patent: Jan. 10, 2017

(54) METHOD AND APPARATUS FOR DETERMINING A CHANGE IN POSITION OF A LOCATION MARKER

(71) Applicant: QUALCOMM Incorporated, San Diego, CA (US)

(72) Inventors: Craig M. Brown, Harbord (AU); Michael W. Paddon, Shinjuku-ku (JP); James A. Christopher, San Diego, CA (US); Anthony D. Moriarty, Wollstonecraft (AU)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 13/768,728

(22) Filed: Feb. 15, 2013

(65) Prior Publication Data
US 2014/0235263 A1    Aug. 21, 2014

(51) Int. Cl.
*H04W 4/02* (2009.01)
*G01S 5/02* (2010.01)
*G01S 5/14* (2006.01)

(52) U.S. Cl.
CPC ............. *G01S 5/0289* (2013.01); *G01S 5/14* (2013.01)

(58) Field of Classification Search
CPC ...... G01S 5/0294; G01S 13/931; G01S 17/50; G01S 17/58; G01S 5/00; G01S 5/22; H04W 4/04; H04W 4/026; H04W 56/0015; H04W 64/00
See application file for complete search history.

(56) References Cited

U.S. PATENT DOCUMENTS

| | | | |
|---|---|---|---|
| 6,937,569 B1 | 8/2005 | Sarkar et al. | |
| 7,769,542 B2 | 8/2010 | Calvarese et al. | |
| 8,089,405 B2 | 1/2012 | Piersol et al. | |
| 8,180,887 B2* | 5/2012 | Li et al. | 709/224 |
| 8,219,028 B1* | 7/2012 | Flamholz | G06F 1/1694 455/41.2 |
| 8,254,264 B1* | 8/2012 | Banerjee et al. | 370/238 |
| 8,677,017 B2* | 3/2014 | Xu et al. | 709/242 |
| 2002/0122003 A1* | 9/2002 | Patwari | G01C 21/206 342/450 |
| 2003/0069694 A1* | 4/2003 | Fuchs et al. | 701/213 |
| 2004/0259522 A1* | 12/2004 | Alicherry | H04W 64/00 455/404.2 |

(Continued)

FOREIGN PATENT DOCUMENTS

| | | |
|---|---|---|
| CN | 1832627 A | 9/2006 |
| WO | 02054100 A2 | 7/2002 |

(Continued)

OTHER PUBLICATIONS

International Search Report and Written Opinion—PCT/US2014/016488—ISA/EPO—Jun. 16, 2014.

*Primary Examiner* — Liton Miah
(74) *Attorney, Agent, or Firm* — Muncy, Geissler, Olds & Lowe, P.C.

(57) ABSTRACT

The disclosure is directed to determining a change in position of a location marker. In an aspect, it is determined whether the location marker is in a motion state or a static state using sensors integrated into the location marker, in response to the determining, one or more reachable nodes are discovered, and distance measurements are calculated from the location marker to each of the one or more reachable nodes.

34 Claims, 5 Drawing Sheets

(56) References Cited

U.S. PATENT DOCUMENTS

| | | |
|---|---|---|
| 2006/0268745 A1 | 11/2006 | Hur et al. |
| 2008/0174445 A1* | 7/2008 | Calvarese et al. ......... 340/686.1 |
| 2008/0234930 A1* | 9/2008 | Cheok ................... G01S 5/0289 |
| | | 701/408 |
| 2010/0110930 A1 | 5/2010 | Kohvakka et al. |
| 2013/0297195 A1* | 11/2013 | Das ....................... G08G 1/163 |
| | | 701/117 |

FOREIGN PATENT DOCUMENTS

| | | |
|---|---|---|
| WO | 2007106972 A1 | 9/2007 |
| WO | 2008116168 A1 | 9/2008 |

\* cited by examiner

METHOD AND APPARATUS FOR DETERMINING A CHANGE IN POSITION OF A LOCATION MARKER

FIELD OF DISCLOSURE

The disclosure is related to a method and apparatus for determining a change in position of a location marker.

BACKGROUND

Conventionally, a number of markers can be deployed that when working in conjunction can determine the location of one or more other devices. When these markers are deployed, their locations need to be determined and stored. Such a system requires significant manual configuration during the initial setup that must be repeated if a marker is moved.

Accordingly, it would be beneficial if a marker could detect when it is moved and automatically trigger a recalibration of the network of markers in response.

SUMMARY

The disclosure is directed to determining a change in position of a location marker. A method for determining a change in position of a location marker determines whether the location marker is in a motion state or a static state using sensors integrated into the location marker, discovers, in response to the determining, one or more reachable nodes, and calculates distance measurements from the location marker to each of the one or more reachable nodes.

An apparatus for determining a change in position of a location marker includes logic configured to determine whether the location marker is in a motion state or a static state using sensors integrated into the location marker, logic configured to discover, in response to the determining, one or more reachable nodes, and logic configured to calculate distance measurements from the location marker to each of the one or more reachable nodes.

An apparatus for determining a change in position of a location marker includes means for determining whether the location marker is in a motion state or a static state using sensors integrated into the location marker, means for discovering, in response to the determining, one or more reachable nodes, and means for calculating distance measurements from the location marker to each of the one or more reachable nodes.

A non-transitory computer-readable medium for determining a change in position of a location marker includes at least one instruction to determine whether the location marker is in a motion state or a static state using sensors integrated into the location marker, at least one instruction to discover, in response to the determining, one or more reachable nodes, and at least one instruction to calculate distance measurements from the location marker to each of the one or more reachable nodes.

BRIEF DESCRIPTION OF THE DRAWINGS

The accompanying drawings are presented to aid in the description of aspects of the disclosure and are provided solely for illustration of the aspects and not limitation thereof.

DETAILED DESCRIPTION

Figure 1:
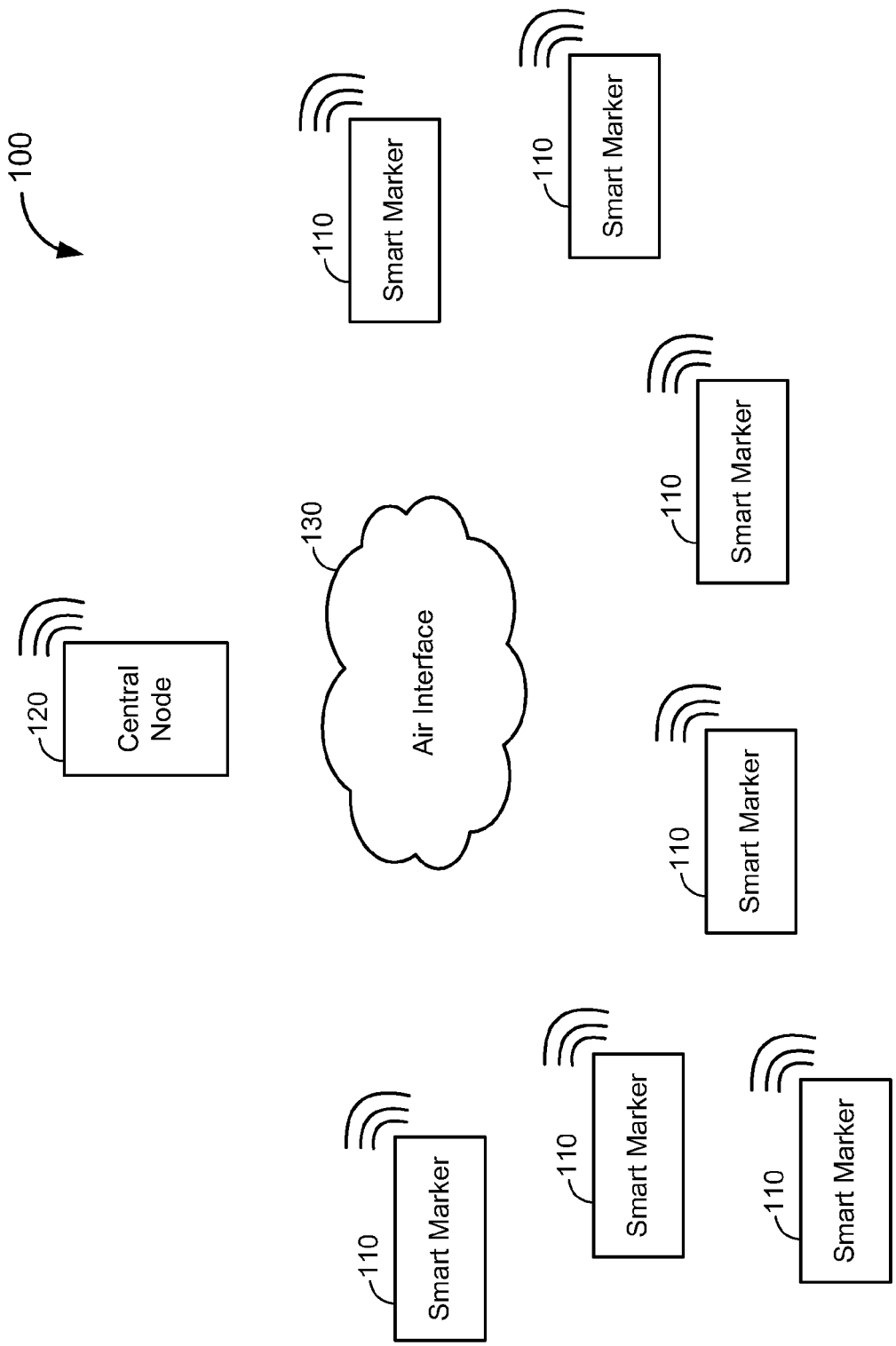
FIG. 1 is a diagram of an exemplary system according to an aspect.

Aspects of the disclosure are disclosed in the following description and related drawings. Alternate aspects may be devised without departing from the scope of the disclosure. Additionally, well-known elements of the various aspects will not be described in detail or will be omitted so as not to obscure the relevant details of the various aspects.

The word "exemplary" is used herein to mean "serving as an example, instance, or illustration." Any aspect described herein as "exemplary" is not necessarily to be construed as preferred or advantageous over other aspects. Likewise, the terms "aspects" or "aspects of the disclosure" do not require that all aspects include the discussed feature, advantage, or mode of operation.

The terminology used herein is for the purpose of describing particular aspects only and is not intended to be limiting of the various aspects. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects disclosed may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Conventionally, a number of markers can be deployed that when working in conjunction can determine the location of one or more other devices. When these markers are deployed, their locations need to be determined and stored. Such a system requires significant manual configuration during the initial setup that must be repeated if a marker is moved.

Accordingly, the various aspects are directed to a network of markers in which a marker can detect when it is moved and trigger a recalibration of the network in response. As an example, a marker in such a network may be a small plug pack device that plugs into a power point in a hospital and is used to track moving equipment and/or people.

If the markers can calculate the distances between themselves and other markers, then they can map their location relative to each other using triangulation. Reducing error in the distance measurements can be better performed when it is known that the markers are stationary. To enable a marker to determine whether or not it is stationary, each marker includes an accelerometer. An intensity threshold can be set on the accelerometer so that small movements are ignored. A frequency threshold can be set on the accelerometer so that vibrations are also ignored. By being able to detect when a marker is moved, the system has the ability to recalibrate the layout of the network of markers in response. In addition, the user can force recalibration by shaking any of the markers and thereby setting off the marker's accelerometer. By using an accelerometer to trigger recalibration, the cost of the markers is significantly reduced, as there is no need to provide buttons or displays to the user. Further, an accelerometer can be mounted in a fully environmentally sealed unit. A marker according to the various aspects is called a "smart marker" or a "node."

FIG. 1 is a block diagram of an exemplary system 100 according to an aspect. System 100 contains a plurality of smart markers 110, a central node 120, and an air interface 130. Smart markers 110 and central node 120 communicate with each other over an air interface 130. The air interface 130 between the smart markers 110 and the central node 120 can be any wireless interface such as a wireless local area network (WLAN), a Bluetooth network, a Wi-Fi network, a Peanut™ network, or any other short-range or medium-range wireless network.

The smart markers 110 are capable of calculating distances to nearby smart markers 110. In one aspect, the calculation that determines the actual positions (e.g., geographic location) of smart markers 110 from the relative distances between the smart markers 110 can be performed at the central node 120. The smart markers 110 send the information they collect to the central node 120 over the air interface 130. The central node 120 combines the measurements and transmits the location (actual position) of each smart marker 110 back to each respective marker 110. The central node 120 can also send the layout (absolute/relative positions) of the entire network of smart markers 110 to each smart marker 110.

Figure 2:
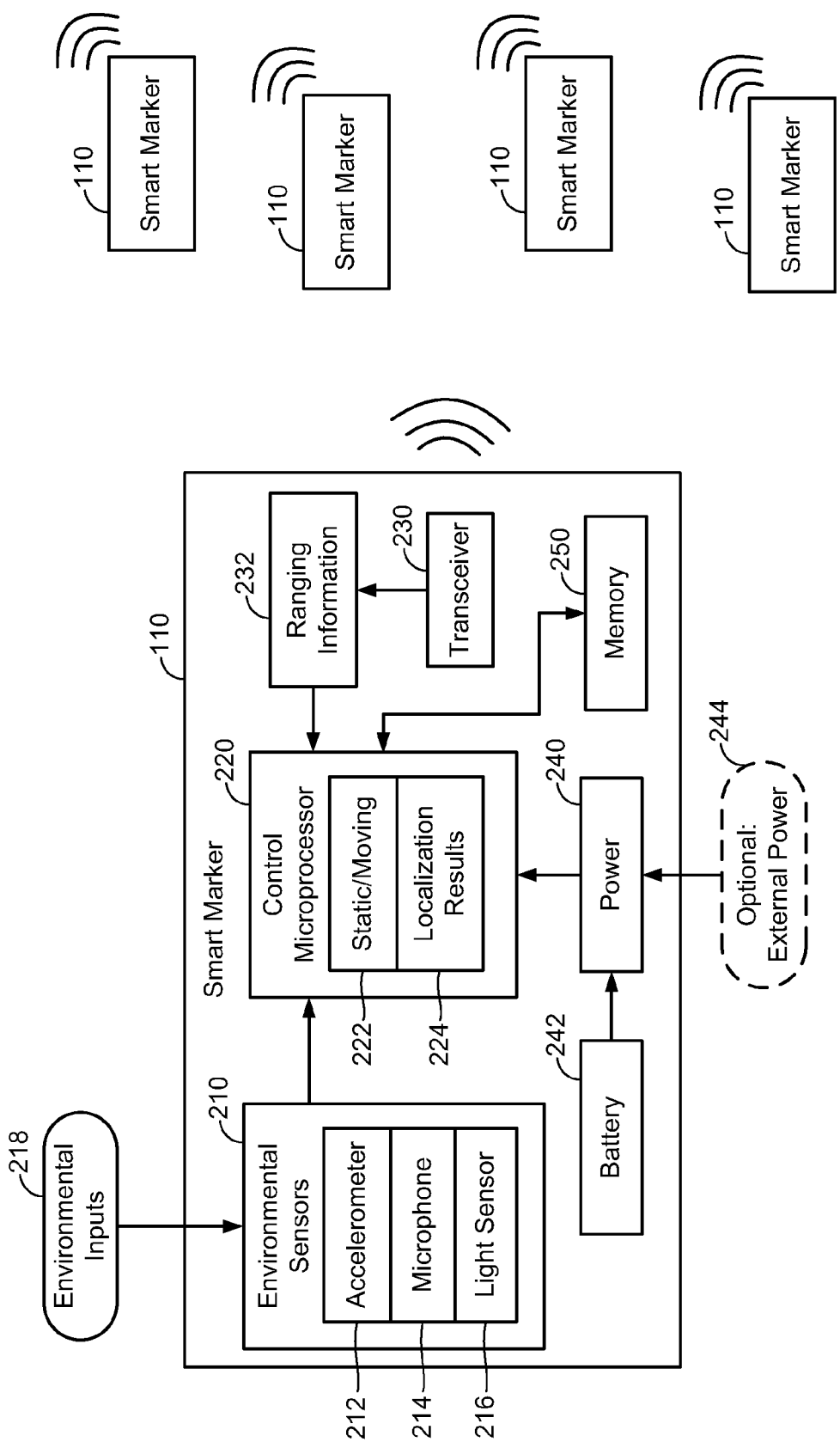
FIG. 2 illustrates an exemplary smart marker in communication with a plurality of other smart markers according to an aspect.

FIG. 2 illustrates an exemplary smart marker 110 in communication with a plurality of other smart markers 110 according to an aspect. The smart marker 110 contains environmental sensors 210, a control microprocessor 220, a transceiver 230, a power unit 240, and a memory 250. The environmental sensors 210 can include an accelerometer 212, a microphone 214, a light sensor 216, and/or a thermal detector (not shown). The environmental inputs 218 detected by environmental sensors 210 can include motion, vibration, acceleration, sound, light, and/or temperature input. The control microprocessor 220 includes a module 222 that determines whether the smart marker 110 is static or moving and a module 224 that determines the smart marker 110's position relative to nearby smart markers 110. A module 232 collects ranging information from transceiver 230, which is used by the module 224 to determine the smart marker 110's relative position. The power unit 240 can be coupled to a battery 242 or optionally to an external power source 244 or may be configured for both. For example, smart marker 110 could be plugged into a power outlet, such as a 120 volt outlet, or a USB port, but also have an internal battery/energy storage source.

Accordingly, the various aspects can include a smart marker 110 or central node 120 including the ability to perform the functions described herein. As will be appreciated by those skilled in the art, the various logic elements can be embodied in discrete elements, software modules executed on a processor or any combination of software and hardware to achieve the functionality disclosed herein. For example, environmental sensors 210, microprocessor 220, transceiver 230, and/or memory 250 may all be used cooperatively to load, store and execute the various functions disclosed herein, and thus the logic to perform these functions may be distributed over various elements. Alternatively, the functionality could be incorporated into one discrete component. Therefore, the features of the smart marker 110 in FIG. 2 are to be considered merely illustrative, and the disclosure is not limited to the illustrated features or arrangement.

Figure 3:
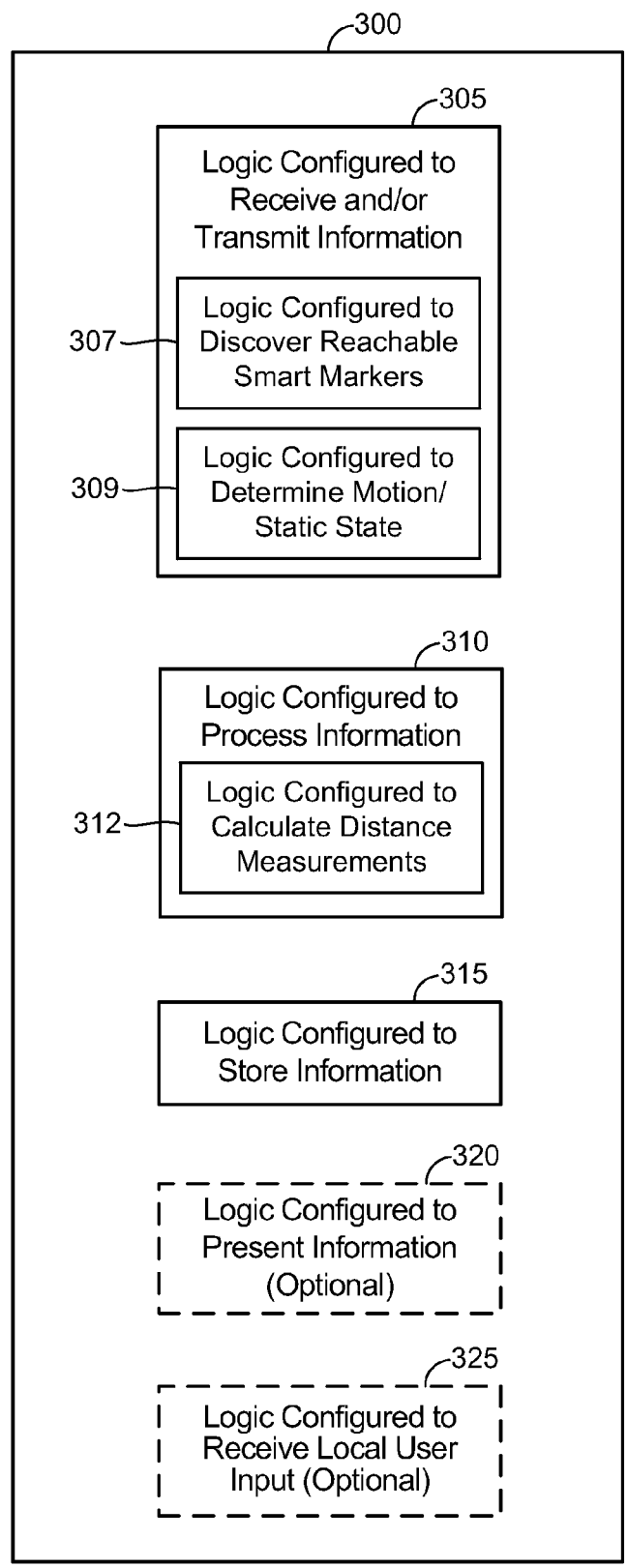
FIG. 3 illustrates a communication device that includes logic configured to perform functionality.

FIG. 3 illustrates a communication device 300 that includes logic configured to perform functionality. The communication device 300 can correspond to any of the above-noted communication devices, including but not limited to smart marker 110 or central node 120. Thus, communication device 300 can correspond to any electronic device that is configured to communicate with (or facilitate communication with) one or more other entities over a network.

Referring to FIG. 3, the communication device 300 includes logic configured to receive and/or transmit information 305. The logic configured to receive and/or transmit information 305 may correspond to the transceiver 230 in FIG. 2. In an example, if the communication device 300 corresponds to a wireless communications device (e.g., smart marker 110 or central node 120), the logic configured to receive and/or transmit information 305 can include a wireless communications interface (e.g., Bluetooth, WiFi, Peanut™, etc.) such as a wireless transceiver and associated hardware (e.g., an RF antenna, RF amplifier, a MODEM, a modulator and/or demodulator, etc.). Accordingly, if communication device 300 corresponds to a smart marker 110, the logic configured to receive and/or transmit information 305 can include or correspond to logic configured to discover one or more reachable smart markers 307. In another example, the logic configured to receive and/or transmit information 305 can correspond to a wired communications interface (e.g., a serial connection, a USB or Firewire connection, an Ethernet connection, etc.). Thus, if the communication device 300 corresponds to some type of network-based server (e.g., central node 120), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a piezoelectric sensor, a light sensor, an antenna for monitoring local RF signals, etc.). Accordingly, if communication device 300 corresponds to a smart marker 110, the logic configured to receive and/or transmit information 305 can include or correspond to logic configured to determine whether the location marker is in a motion state or a static state 309. The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor, such as control microprocessor 220 in FIG. 2. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. Accordingly, if communication device 300 corresponds to a smart marker 110, the logic configured to process information 310 can include or correspond to logic configured to calculate distance measurements from the communication device 300 to each of one or more reachable smart markers 312. For example, the processor included in the logic configured to process information 310 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. The logic configured to store information 315 may correspond to memory 250. In an example, the logic configured to store information 315 can include at least a non-transitory memory and associated hardware (e.g., a memory controller, etc.). For example, the non-transitory memory included in the logic configured to store information 315 can correspond to random access memory (RAM), flash memory, read only memory (ROM), erasable programmable ROM (EPROM), electrically erasable programmable ROM (EEPROM), registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. The logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 300. The logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

It will be appreciated that the configured logic or "logic configured to" in the various blocks are not limited to specific logic gates or elements, but generally refer to the ability to perform the functionality described herein (either via hardware or a combination of hardware and software). Thus, the configured logic or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Smart markers 110 alternate between two main logical states: in motion and static. While a smart marker 110 is in the static state initially (e.g., after startup, after a motion state, after a reset), it gathers distance measurements to reachable smart markers 110 and information about the state of its ambient environment, such as light, sound, and/or temperature. Data gathered while the smart marker 110 is in the static state is transmitted to and stored at the central node 120.

Once the smart marker 110 determines its relative position, it can stop trying to collect information regarding its position and go into the static state. This prevents the smart markers 110 from flooding the wireless network with distance requests to calculate already-known information. When the smart marker 110 moves, it goes into the motion state and re-determines its position.

The central node 120 can maintain and distribute the connection state of the network, its location matrices, as well as the history of the smart markers' 110 ambient state. With this centralized information, the central node 120 can generate the most likely internally consistent layout of the smart markers 110 in their environment.

A set of static smart markers 110 will each have an arbitrary coordinate in a common unit to which to reference their relative locations. When a smart marker 110 begins to move (e.g., as indicated by acceleration above a threshold), the central node 120 can drop that smart marker's 110 information and the moving smart marker 110 begins to measure its own position relative to reachable static smart markers 110. The position the moving smart marker 110 infers using distance measurements and the known static layout is periodically updated with the central node 120 to create a physical path history for the smart marker 110.

Alternatively, instead of the smart marker 110 measuring its position relative to reachable static smart markers 110 as it moves, the moving smart marker 110 can wait until it stops moving to update the central node 120 with its new information, as it otherwise would.

The processes of static and dynamic localization continue on an ad hoc basis until the network of smart markers 110 and the central node 120 is disabled.

The coordinates of the absolute location for the smart markers 110 can be determined using short-range wireless transfer. For example, the location coordinates can be tuples (X, Y, Z) representing global positioning system (GPS) positions (latitude, longitude, altitude).

A smart marker 110 can use short-range wireless transfer to communicate with other smart markers 110. The central node 120 is more powerful and can communicate over larger distances than can the smart markers 110. It also contains a wired-link to a network and knows its own GPS position.

A local smart marker $n_i$ is a smart marker that is within range of wireless communication. A smart marker $n_i$ uses short-range wireless transfer to discover the distance to each local smart marker. The information gathered by each smart marker is relayed back to a central node 120 for processing.

The central node 120 builds a multivariate quadratic system of equations using the information received. This system of equations can generally be solved using standard algorithms to find a unique solution, provided there are a sufficient number of equations in comparison to the number of variables. Solving these types of systems becomes less complex if the system is over-defined (i.e., the number of equations>the number of variables).

Two Dimensions

Assumption 1: Each smart marker is local to at least two other smart markers.

Assumption 2: Each central node 120 is local to at least two other smart markers.

Let $(X_i, Y_i)$ denote the absolute coordinates of smart marker $n_i$. The distance $d_{ij}$ between two smart markers $n_i$ and $n_j$ can be expressed as:

$$(X_i-X_j)^2+(Y_i-Y_j)^2=d_{ij}^2.$$

For each smart marker, there are two unknown variables $(X_i, Y_i)$. For a system of n smart markers, this gives 2n variables. For each smart marker-smart marker distance discovered, there is one equation in four variables. For each smart marker-central node 120 distance discovered, there is one equation in two variables (since the central node 120 coordinates are known).

If assumption 1 holds, the number of smart marker-smart marker equations is at least 2n−3 in 2n variables. Each central node 120-smart marker introduces at least two more equations with no additional variables. For a system including four central nodes 120-smart markers, there are at least 2n+5 equations in 2n variables.

Three Dimensions

Assumption 1: Each smart marker is local to at least three other smart markers.

Assumption 2: Each central node 120 is local to at least three other smart markers.

Let $(X_i, Y_i, Z_i)$ denote the absolute coordinates of smart marker $n_i$. The distance $d_{ij}$ between two smart markers $n_i$ and $n_j$ can be expressed as:

$$(X_i-X_j)^2+(Y_i-Y_j)^2+(Z_i-Z_j)^2=d_{ij}^2.$$

For each smart marker, there are three unknown variables $(X_i, Y_i, Z_i)$. For a system of n smart markers, this gives 3n variables. For each smart marker-smart marker distance discovered, there is one equation in six variables. For each smart marker-central node 120 distance discovered, there is one equation in three variables (since the central node 120 coordinates are known).

If assumption 1 holds, the number of smart marker-smart marker equations is at least 3n−3 in 3n variables. Each central node 120-smart marker introduces at least three more equations with no additional variables. For a system including four central nodes 120-smart markers, there are at least 3n+9 equations in 3n variables.

Figure 4A:
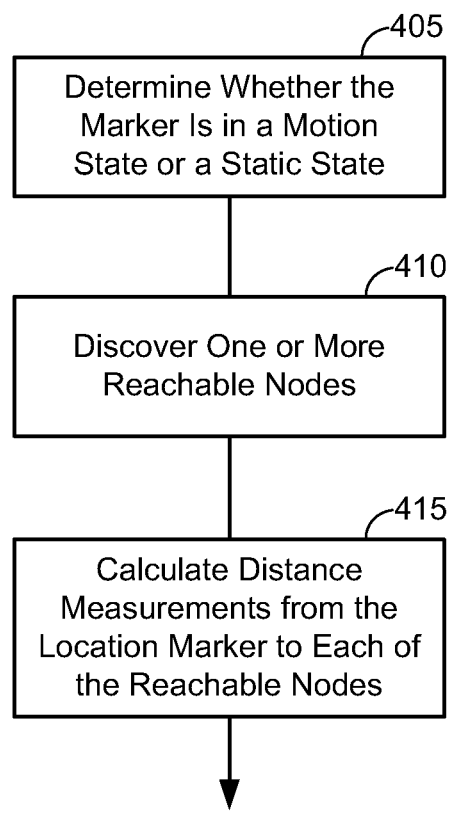
FIG. 4A illustrates an exemplary flow for determining a change in position of a location marker.

FIG. 4A illustrates an exemplary flow for determining a change in position of a location marker, such as a smart marker 110. At 405, the location marker determines whether it is in a motion state or a static state using sensors integrated into the location marker. At 410, the location marker discovers, in response to the determining, one or more reachable nodes. At 415, the location marker calculates distance measurements from the location marker to each of the one or more reachable nodes.

Figure 4B:
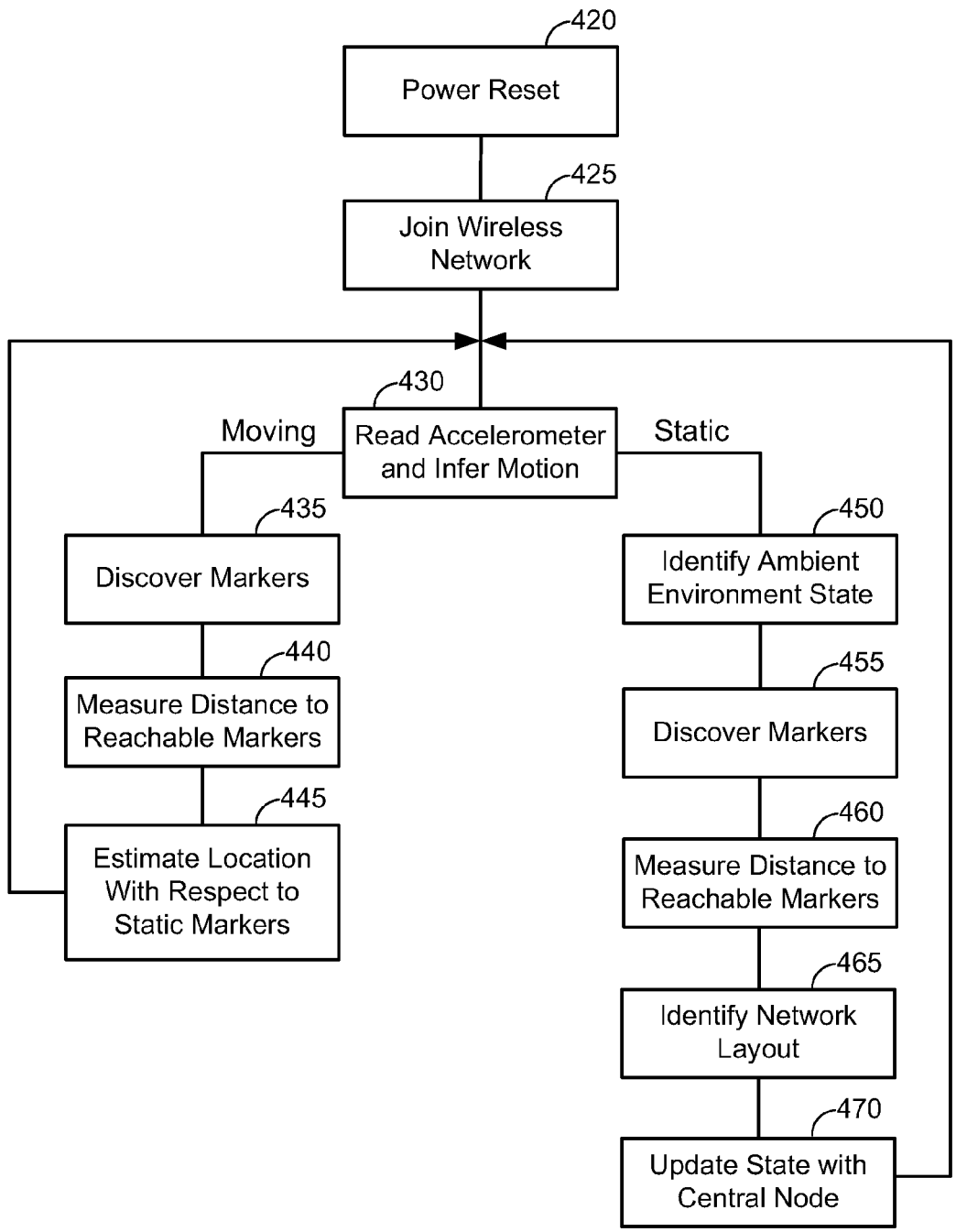
FIG. 4B illustrates an exemplary flow for determining a change in position of a smart marker.

FIG. 4B illustrates an exemplary flow for determining a change in position of a smart marker 110. At 420, the smart marker 110 is powered on, or is powered off then on (i.e. a power reset). At 425, the smart marker 110 detects and joins the wireless network serving the network of smart markers 110.

At 430, the smart marker 110 reads the accelerometer data and determines whether it is static or moving. The smart marker 110 can determine that it is moving if the intensity of a motion detected by the accelerometer is greater than an intensity threshold. In this way, small movements are ignored. A frequency threshold can be set on the accelerometer so that vibrations are also ignored.

If the smart marker 110 is moving, then at 435, it can attempt to discover nearby smart markers 110 connected to the same wireless network. At 440, the smart marker 110 measures the distances to reachable smart markers 110. At 445, the smart marker 110 estimates its location with respect to static smart markers 110. The smart marker 110 can determine which reachable smart markers 110 are static based on information from the central node 120 or the reachable smart markers 110 themselves.

The smart marker 110 then continues to monitor its motion state, as indicated by the arrow returning to 430. The smart marker 110 can continuously or periodically determine its motion state. If the smart marker 110 is in a motion state, for example, it can determine its motion state more frequently than if it is in a static state. As another example, the smart marker 110 can determine its motion state less frequently if the charge level of its battery is below a threshold.

If, at 430, the smart marker 110 determines it is static, then at 450, it identifies its ambient environmental state using various environmental sensors 210. The smart marker 110 can identify environmental factors such as sound, light, and/or temperature, in addition to motion. At 455, the smart marker 110 attempts to discover nearby smart markers 110 connected to the same wireless network. At 460, the smart marker 110 measures the distances to static reachable smart markers 110, as at 440.

At 465, the smart marker 110 identifies the network layout. That is, the smart marker 110 determines its relative location based on the distances to the reachable smart markers 110. At 470, the smart marker 110 updates its state with the central node 120, which uses the information to determine the layout of the all the smart markers 110 in the network, including the absolute position of the smart marker 110 performing the flow.

The smart marker 110 then continues to monitor its motion state, as indicated by the arrow returning to 430. Even if the smart marker 110 remains in the static state, it can periodically perform 450 to 470 to determine changes to the network since the last discovery and network layout phases. For example, smart markers 110 may be added or removed from the network, or may be moved from one location to another.

The central node 120 can transmit the smart marker 110's absolute position to the smart marker 110, and can also transmit the absolute locations of the other static smart markers 110 in the network of smart markers 110. The smart marker 110 can then provide this information to other smart markers 110 during the smart marker 110 discovery and network layout phases.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various aspects disclosed and claimed.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect can include a computer readable media embodying a method for a location sensitive marker reset. Accordingly, the various aspects are not limited to illustrated examples, and any means for performing the functionality described herein are included in the various aspects.

While the foregoing disclosure shows illustrative aspects, it should be noted that various changes and modifications could be made herein without departing from the scope of the various aspects as defined by the appended claims. The functions, steps and/or actions of the method claims in accordance with the various aspects described herein need not be performed in any particular order. Furthermore, although elements of the various aspects may be described or claimed in the singular, the plural is contemplated unless limitation to the singular is explicitly stated.

What is claimed is:

1. A method for determining a change in position of a location marker, comprising:
   determining, by the location marker, whether the location marker is in a motion state or a static state using sensors integrated into the location marker;
   discovering, by the location marker in response to the determining, one or more reachable nodes;
   calculating, by the location marker, distance measurements from the location marker to each of the one or more reachable nodes;
   identifying, by the location marker, an environmental state of the location marker; and providing, by the location marker, the environmental state and the distance measurements to a central position determination node based on the location marker being in the static state.

2. The method of claim 1, wherein the environmental state of the location marker includes a detected amount of noise, a detected amount of light, and/or an air temperature.

3. The method of claim 1, further comprising:
estimating a position of the location marker with respect to the one or more reachable nodes based on the location marker being in the motion state.

4. The method of claim 3, wherein the one or more reachable nodes are in a static state.

5. The method of claim 1, wherein the motion state or the static state is determined by one or more accelerometers or piezoelectric sensors of the location marker.

6. The method of claim 1, further comprising:
determining whether one or more new nodes are reachable by periodically performing a node discovery process while in the static state.

7. The method of claim 1, wherein at least one of the one or more reachable nodes comprises another location marker.

8. The method of claim 1, wherein at least one of the one or more reachable nodes comprises a central node in communication with a plurality of location markers.

9. The method of claim 1, further comprising:
identifying a relative network layout based on the one or more reachable nodes that are discovered.

10. The method of claim 1, further comprising:
detecting a change from the static state to the motion state.

11. The method of claim 10, wherein the change from the static state to the motion state is based on user activity.

12. The method of claim 11, wherein the user activity comprises shaking the location marker.

13. The method of claim 1, wherein the determining comprises:
determining whether an acceleration of the location marker is above a threshold.

14. The method of claim 13, wherein the threshold comprises at least one of a motion intensity threshold or a motion frequency threshold.

15. An apparatus for determining a change in position of a location marker, comprising:
at least one processor configured to:
determine whether the location marker is in a motion state or a static state based on information from sensors integrated into the location marker;
cause a transceiver of the location marker to discover, in response to the determination, one or more reachable nodes;
calculate distance measurements from the location marker to each of the one or more reachable nodes;
identify an environmental state of the location marker; and
cause the transceiver to provide the environmental state and the distance measurements to a central position determination node based on the location marker being in the static state.

16. The apparatus of claim 15, wherein the environmental state of the location marker includes a detected amount of noise, a detected amount of light, and/or an air temperature.

17. The apparatus of claim 15, wherein the at least one processor is further configured to:
estimate a position of the location marker with respect to the one or more reachable nodes if the location marker is in the motion state.

18. The apparatus of claim 17, wherein the one or more reachable nodes are in a static state.

19. The apparatus of claim 15, wherein the motion state or the static state is determined based on information from one or more accelerometers or piezoelectric sensors of the location marker.

20. The apparatus of claim 15, wherein the at least one processor is further configured to:
determine whether one or more new nodes are reachable based on periodic performance of a node discovery process while in the static state.

21. The apparatus of claim 15, wherein at least one of the one or more reachable nodes comprises another location marker.

22. The apparatus of claim 15, wherein at least one of the one or more reachable nodes comprises a central node in communication with a plurality of location markers.

23. The apparatus of claim 15, wherein the at least one processor is further configured to:
identify a relative network layout based on the one or more reachable nodes that are discovered.

24. The apparatus of claim 15, wherein the at least one processor is further configured to:
detect a change from the static state to the motion state.

25. The apparatus of claim 24, wherein the change from the static state to the motion state is based on user activity.

26. The apparatus of claim 25, wherein the user activity comprises shaking the location marker.

27. The apparatus of claim 15, wherein the at least one processor being configured to determine comprises:
the at least one processor being configured to determine whether an acceleration of the location marker is above a threshold.

28. The apparatus of claim 27, wherein the threshold comprises at least one of a motion intensity threshold or a motion frequency threshold.

29. An apparatus for determining a change in position of a location marker, comprising:
a processing means for:
determining whether the location marker is in a motion state or a static state based on information from sensors integrated into the location marker;
causing a communication means of the location marker to discover, in response to the determination, one or more reachable nodes;
calculating distance measurements from the location marker to each of the one or more reachable nodes;
identifying an environmental state of the location marker; and
causing the communication means to provide the environmental state and the distance measurements to a central position determination node based on the location marker being in the static state.

30. The apparatus of claim 29, wherein the processing means is further for:
estimating a position of the location marker with respect to the one or more reachable nodes based on the location marker being in the motion state.

31. The apparatus of claim 29, wherein the processing means is further for:
identifying a relative network layout based on the one or more reachable nodes that are discovered.

32. A non-transitory computer-readable medium for determining a change in position of a location marker, comprising:

at least one instruction to cause the location marker to determine whether the location marker is in a motion state or a static state using sensors integrated into the location marker;

at least one instruction to cause the location marker to discover, in response to the determining, one or more reachable nodes; and at least one instruction to cause the location marker to calculate distance measurements from the location marker to each of the one or more reachable nodes at least one instruction to cause the location marker to identify an environmental state of the location marker; and at least one instruction to cause the location marker to provide the environmental state and the distance measurements to a central position determination node based on the location marker being in the static state.

33. The non-transitory computer-readable medium of claim 32, further comprising:

at least one instruction to cause the location marker to estimate a position of the location marker with respect to the one or more reachable nodes based on the location marker being in the motion state.

34. The non-transitory computer-readable medium of claim 32, further comprising:

at least one instruction to cause the location marker to identify a relative network layout based on the one or more reachable nodes that are discovered.

* * * * *